United States Patent
Solazzo

(10) Patent No.: US 12,007,285 B2
(45) Date of Patent: Jun. 11, 2024

(54) WIRELESS FLUID TEMPERATURE SENSING OF A MULTIWAY VALVE

(71) Applicant: WOCO Industrietechnik GmbH, Bad Soden-Salmünster (DE)

(72) Inventor: Domenico Solazzo, Worms (DE)

(73) Assignee: Woco Industrietechnik GmbH, Bad Soden-Salmünster (DE)

(*) Notice: Subject to any disclaimer, the term of this patent is extended or adjusted under 35 U.S.C. 154(b) by 18 days.

(21) Appl. No.: 17/398,263

(22) Filed: Aug. 10, 2021

(65) Prior Publication Data

US 2022/0049787 A1 Feb. 17, 2022

(30) Foreign Application Priority Data

Aug. 11, 2020 (DE) .......................... 102020121056.6

(51) Int. Cl.
| | | |
|---|---|---|
| G01K 13/02 | (2021.01) | |
| G01K 1/024 | (2021.01) | |
| G01K 7/22 | (2006.01) | |
| H01C 7/04 | (2006.01) | |
| F16K 31/00 | (2006.01) | |
| F16K 31/06 | (2006.01) | |

(52) U.S. Cl.
CPC .......... *G01K 13/026* (2021.01); *G01K 1/024* (2013.01); *G01K 7/22* (2013.01); *H01C 7/04* (2013.01); *F16K 31/002* (2013.01); *F16K 31/0668* (2013.01); *F16K 31/0675* (2013.01)

(58) Field of Classification Search
CPC ........ G01K 13/026; G01K 1/024; G01K 7/22; G01K 2205/00; H01C 7/04; F16K 31/002; F16K 31/0675; F16K 31/0668
USPC .......................................................... 361/178
See application file for complete search history.

(56) References Cited

U.S. PATENT DOCUMENTS

| | | | |
|---|---|---|---|
| 3,094,132 A | 6/1963 | Byloff | |
| 5,628,296 A * | 5/1997 | Herrington | ............ F02M 26/53 |
| | | | 123/568.21 |

FOREIGN PATENT DOCUMENTS

| | | | |
|---|---|---|---|
| DE | 10 2014 108 603 A1 | 6/2015 | |
| GB | 885846 A | * 12/1961 | |
| GB | 927294 | 5/1963 | |
| GB | 927294 A | * 5/1963 | |

OTHER PUBLICATIONS

German Examination Report dated Jul. 19, 2021 for German Patent Application No. 10 2020 121 056.6 (13 pp.) (German language with two-page English explanations).

* cited by examiner

*Primary Examiner* — Kevin J Comber
(74) *Attorney, Agent, or Firm* — Banner & Witcoff Ltd.

(57) ABSTRACT

The embodiments relate to a method for detecting the temperature of a fluid flow of a control valve which has an electromagnetic actuator, in which a temperature-sensitive resistor is exposed to the fluid flow, and is integrated into a detection circuit. As a function of the fluid temperature, a primary circuit of the electromagnetic actuator is inductively influenced by the detection circuit.

18 Claims, 2 Drawing Sheets

WIRELESS FLUID TEMPERATURE SENSING OF A MULTIWAY VALVE

RELATED APPLICATION

This application claims the benefit and priority of German Patent Application DE 10 2020 121 056.6, filed Aug. 11, 2020, which is incorporated by reference herein in its entirety.

TECHNICAL FIELD

The present embodiments relate to a method and a device for detecting the temperature of a fluid flow of a control valve. Furthermore, the present embodiments provide a control valve, in particular a directional control valve, for adjusting a fluid flow, for example in a motor vehicle. Control valves of this type are used, for example, for adjusting, in particular distributing and/or mixing, process fluids in oil and/or cooling circuits, in particular of motor vehicles.

BACKGROUND

The temperature of a process fluid, for example coolant or engine oil, has a significant influence on its viscosity and the associated flow, lubrication, wear and/or durability properties of the fluids. In addition, the fluid temperature is often critical to the intended use of the fluids, for example, to set an operating temperature of a functional component, such as a vehicle engine. The setting of a predetermined fluid temperature depends to a large extent on a reliable measurement of the fluid temperature.

In the state of the art, temperature sensors, in particular temperature sensors, whose measuring points are in direct contact with the fluid are used to measure or monitor the fluid temperature in a fluid circuit. Typically, corresponding temperature sensors have a measuring section consisting of a temperature-sensitive resistor arranged in a fluid channel of the valve housing and a signal output arranged outside the fluid channel with an electronic, wired connection to an electronic controller, for example a control valve or vehicle controller. The controller receives and processes the temperature signals. Based on the received temperature signals, components associated with the fluid circuit can be controlled. Due in particular to their size, connection dimensions and cable connections to the electronic control system, the temperature sensors previously had to be installed in the fluid channel at a distance upstream and/or downstream of the actuating element of the control valve, i.e. in the area of an inlet to the control valve and in the area of an outlet from the control valve.

Such a thermostatic valve is known from DE 102014108603 A1. DE 102014108603 A1 discloses a thermostatic valve for controlling the circulation of cooling water in a vehicle, which is capable of determining whether the thermostatic valve is operating normally or not by measuring the temperature respectively upstream and downstream of the valve members. The temperature sensors are inserted into the inlet and outlet channels via housing feedthroughs. By comparing the temperature readings from the inlet temperature sensor and the outlet temperature sensor, the operating status of the thermostatic valve can be determined.

One disadvantage of the known temperature measurements is that two temperature sensors are necessary, which, among others things, leads to increased costs. Furthermore, the measurement result deteriorates due to the difference between the two temperature values. Furthermore, cable-based signal transmission has proven to be disadvantageous for installation space reasons on the one hand and for cost reasons on the other. In addition, the temperature recording is distorted by ambient conditions, since housing feedthroughs are necessary for mechanical or electronic components of the temperature sensors in order to expose them to the fluid. In the prior art, it is not possible to measure the temperature in a mixing chamber or fluid channel branch, for example at the valve seat of the control valve.

SUMMARY

It is the task of the embodiments to overcome the disadvantages of the prior art, in particular to enable more reliable and/or less expensive fluid temperature detection in a control valve.

According to one embodiment, a method for detecting the temperature of a fluid flow of a control valve is provided. Generic control valves are connected to a fluid circuit of, for example, a motor vehicle. For example, it may be an oil, water or air conditioning circuit of a motor vehicle, in particular in the engine area and/or in the battery area, in particular in motor vehicles operated by electric motors. The control valve is used to adjust, in particular to distribute, mix or shut off process fluids in the oil, water or air conditioning circuits of motor vehicles. Control valves of this type are actuated by an electromagnetic actuator in order to be able to realize different operating states, i.e. valve positions, of the actuating element.

In the method according to one embodiment, a temperature-sensitive resistor such as a thermistor, in particular a Negative Temperature Coefficient thermistor, is exposed to the fluid flow. The temperature-sensitive resistor is set up in such a way that it changes its temperature and thus its resistance as a function of the temperature of the fluid flow, for example of the coolant. The temperature-resistance characteristic of the temperature-sensitive resistor may be non-linear. The temperature-sensitive resistor may be arranged, for example, in the region of an actuating element for closing and at least partially opening a fluid channel of the control valve and/or in the region of a valve seat cooperating with the actuating element. In the case that the control valve is a directional control valve, in particular a multi-way valve, such as a ³⁄₂-way or a ⁴⁄₃-way valve, in which at least two fluid inlets open into a common mixing chamber from which at least one fluid outlet extends, the temperature-sensitive resistor may be arranged in the region of the mixing chamber. The fact that the temperature-sensitive resistor is exposed to the fluid flow does not necessarily require that the temperature-sensitive resistor comes into direct contact with the fluid flow, for example that it may not have a housing or the like. It can also be understood by this that the temperature-sensitive resistor may, for example, be surrounded by a housing, may be accommodated in a separate measuring chamber, or may, for example, be integrated, in particular injected or molded, into the control valve housing, in particular the valve seat, or the actuating element. Rather, it is to be understood that the temperature-sensitive resistor is arranged in such a way that it is capable of sensing the fluid flow temperature so that it can react to a change in the fluid temperature, and/or that the temperature-sensitive resistor is arranged within a control valve housing delimiting a fluid channel through which the fluid flow is guided.

Furthermore, the temperature-sensitive resistor is integrated into a detection circuit. The detection circuit can, for example, be part of the electromagnetic actuator, in particular the electric motor, such as a brushless DC motor (BLDC).

According to one embodiment, a primary circuit of the electromagnetic actuator, in particular the electric motor, is inductively influenced by the detection circuit depending on the fluid temperature. In this way, it is possible to transmit energy wirelessly or without contact. Electrical connection cables and housing feedthroughs for the electrical connection cables can be dispensed with. This results in significantly reduced costs and better sealing of the control valve, or eliminates the need for complex seals in the area of the housing feedthroughs for the electrical connection cables. Due to the inductive coupling of the detection circuit, in particular inside the control valve housing, and the primary circuit of the electromagnetic actuator, in particular outside the control valve housing, the circuits induce changes in each other in dependence on the fluid temperature to be detected. The inventors of the present invention have found that the components for setting the control valve, namely those of the electromagnetic actuator, which are present anyway, can be used for fluid temperature sensing. For example, the electromagnetic actuator may be a 3-phase BLDC, a so-called brushless DC motor, in which one phase is always inactive, which can then act as a primary circuit and be inductively influenced by the active detection circuit within the control valve housing.

In another embodiment, the inductive influence on the primary circuit is associated with a fluid temperature. The inductive influence on the primary circuit can cause a change in its magnetic field and/or its current strength, which change can be assigned to a fluid temperature. For example, this can be done via a value table. It can be ensured, for example, that the circuits, in particular their coils, have a constant position relative to each other and/or that the primary circuit, in particular its coil, experiences a constant excitation from the electromagnetic actuator.

In another embodiment, a change in the fluid temperature causes a change in the resistance value of the temperature-sensitive resistor. This is related to the fact that, as a result of the fluid temperature change, the temperature of the temperature-sensitive resistor changes, causing its resistance value to change according to its temperature-resistance characteristic. This change in resistance can then result in a change in the detection circuit, in particular its magnetic field or its current intensity. Based on the known characteristic curve of the temperature-sensitive resistor and the prevailing current strength as well as the prevailing magnetic field, the change in the detection circuit is thus also known. The detection circuit can further comprise, for example, a detection coil coupled to the temperature-sensitive resistor, in particular connected in series, which produces a magnetic field when current flows. If the resistance value of the temperature-sensitive resistor changes, the current applied to the detection coil changes, so that the magnetic field produced by the detection coil also changes. The change in the magnetic field of the detection circuit, in particular of the detection coil, induces a change in the primary circuit, in particular in its primary coil. The principle behind this can be based on magnetic resonance. As a result of the inductive influence of the detection circuit on the primary circuit, a change in the magnetic field at the primary coil can be induced, resulting in a change in the current passing through the primary coil, in particular the primary current intensity. This change directly affects the electromagnetic actuator. For example, a change in power and/or energy output must occur at the electromagnetic actuator in order to respond to the changed, induced current intensity. Based on the power and/or energy output change at the electromagnetic actuator, a certain fluid temperature can be inferred. In this respect, value tables or other correlations can be applied.

According to another embodiment, the inductive influence on the primary circuit changes its power and/or energy consumption. The inductive influence of the primary circuit by the detection circuit can cause a change in current intensity, as already explained. In order to compensate for the change in current intensity, the electromagnetic actuator can, for example, counteract this via its primary circuit, for example by increasing or decreasing energy consumption or power output, depending on the effect of the change in current intensity.

According to another embodiment, the change in power and/or energy consumption of the primary circuit, in particular of the electromagnetic actuator, is used to infere a fluid temperature. This can be done by value tables or other suitable correlation measures. For example, a correlation graph or correlation table between power and/or energy consumption change and fluid temperature can be created by a pre-initialization. This correlation can, for example, be stored in an electronic control unit of the control valve and/or the motor vehicle.

In another embodiment, the fluid temperature is monitored continuously or cyclically, in particular at predetermined time intervals or initiated by predetermined events, such as control valve movements, in particular control valve increments or angle changes. For example, a table of values can be created or a graph can be generated. For example, a control and/or regulation measure can be derived on the basis of the monitoring. It is possible to compare the detected and monitored fluid temperature with target fluid temperatures. Limit values for permissible deviations of the fluid temperature can be defined. Furthermore, it is possible to derive the control and/or regulation measures on the basis of the comparison of the recorded or monitored fluid temperature and the target fluid temperature.

According to another embodiment, which is combinable with the preceding aspects and exemplary embodiments, a device for detecting the temperature of a fluid flow of a control valve comprising an electromagnetic actuator is provided. Generic control valves are connected to a fluid circuit of, for example, a motor vehicle. For example, it may be an oil, water or air conditioning circuit of a motor vehicle, in particular in the engine area and/or in the battery area, in particular in motor vehicles operated by electric motors. The control valve is used to adjust, in particular to distribute, mix or shut off process fluids in the oil, water or air conditioning circuits of motor vehicles. Control valves of this type are actuated by an electromagnetic actuator in order to be able to realize different operating states, i.e. valve positions, of the actuating element.

The device according to another embodiment comprises a detection circuit with a temperature-sensitive resistor, such as a thermistor, in particular a Negative Temperature Coefficient thermistor, integrated therein and exposed to the fluid flow. The temperature-sensitive resistor can be set up in such a way that it changes its temperature and thus its resistance as a function of the temperature of the fluid flow, for example of the coolant. The temperature-resistance characteristic of the temperature-sensitive resistor may be nonlinear. The temperature-sensitive resistor may be arranged, for example, in the region of an actuating element for closing and at least partially opening a fluid channel of the control valve and/or in the region of a valve seat cooperating with the actuating element. In the case that the control valve is a directional control valve, in particular a multi-way valve, such as a ³⁄₂-way or a ⁴⁄₃-way valve, in which at least two fluid inlets open into a common mixing chamber from which at least one fluid outlet extends, the temperature-sensitive resistor may be arranged in the region of the mixing chamber. The fact that the temperature-sensitive resistor is exposed to the fluid flow does not necessarily require that the temperature-sensitive resistor comes into direct contact with the fluid flow, for example that it may not have a housing or the like. It can also be understood by this that the temperature-sensitive resistor may, for example, be surrounded by a housing, may be accommodated in a separate measuring chamber, or may, for example, be integrated, in particular injected or molded, into the control valve housing, in particular the valve seat, or the actuating element. Rather, it is to be understood that the temperature-sensitive resistor is arranged in such a way that it is capable of sensing the fluid flow temperature so that it can react to a change in the fluid temperature, and/or that the temperature-sensitive resistor is arranged within a control valve housing defining a fluid channel through which the fluid flow is guided.

Further, the device comprises electronics. For example, the electronics may comprise a microprocessor, such as a chip. The electronics may further comprise a memory and/or a processor.

According to another embodiment, the device is designed to inductively influence the electromagnetic actuator. The inductive influence is therefore contactless or wireless, so that a simple and/or cost-effective solution is provided. In this way, it is possible to transmit energy wirelessly or contactlessly. Electrical connection cables and housing bushings for electrical connection cables can be dispensed with. This results in significantly reduced costs and better sealing of the control valve, or eliminates the need for costly seals in the area of the housing feedthroughs for the electrical connection cables. Due to the inductive coupling of the device with the electromagnetic actuator, in particular outside the control valve housing, mutual changes in power and/or consumption can be caused depending on the sensed fluid temperature, which in turn can be sensed and assigned to a fluid temperature.

In another embodiment, the electronics are designed to assign the inductive influence of the electromagnetic actuator to a fluid temperature.

In a further embodiment of the device, the detection circuit further comprises a detection coil to which the temperature-sensitive resistor is coupled, in particular connected in series. The detection circuit can be arranged such that a current flowing through the detection coil causes a magnetic field which can be inductively coupled to the electromagnetic actuator, in particular can inductively influence the latter.

According to another embodiment of the device, the temperature-sensitive resistor is designed to change its resistance as a result to a change in fluid temperature and to change the power and/or energy consumption of the detection coil. In other words, the resistance value of the temperature-sensitive resistor may change as a function of the detected or sensed fluid temperature according to the temperature-resistance characteristic of the temperature-sensitive resistor. Due to the change in resistance, a change in current strength is accompanied, i.e. the current applied to the detection coil, in particular its current strength, changes. This results in a change in the magnetic field generated by the detection coil. Accordingly, a change in the current strength of the detection coil causes a change in the power and/or energy consumption of the detection coil.

According to another embodiment of the device, the detection coil is inductively coupled to the electromagnetic actuator, in particular a primary coil of the electromagnetic actuator, in such a way that its power and/or energy consumption changes/change. For example, the electromagnetic actuator is a 3-phase brushless DC motor (BLDC) in which the primary circuit is comprised by a so-called primary coil and the current flowing through it, which is generated by the electromagnetic actuator.

In another embodiment, the electronics are set up to detect the change in power and/or energy consumption of the electromagnetic actuator, in particular of a primary coil of the electromagnetic actuator, and to assign it to a fluid temperature. The assignment can be done, for example, using value tables or other correlation measures. For example, a pre-initialization of the control valve or the device can be performed to detect and/or store the correlation.

According to another embodiment, the electronics are configured to monitor the fluid temperature. Alternatively, the electronics may be coupled to monitoring electronics. Either the electronics and/or the monitoring electronics may be arranged to initialize and/or display control and/or regulation measures depending on the detected or monitored fluid temperature, respectively. The electronics or the monitoring electronics can comprise a memory and/or a processor, which is designed to perform the calculation or comparison calculations. For example, a comparison of the detected or monitored fluid temperature with a target fluid temperature can be made. Based on the comparison, decisions can be made as to whether a critical or faulty condition exists.

According to another embodiment, which can be combined with the preceding aspects and exemplary embodiments, a control valve, in particular a directional control valve, such as a ³⁄₂-way or a ⁴⁄₃-way valve, is provided for adjusting a fluid flow of, for example, a motor vehicle. Generic control valves are connected to a fluid circuit of, for example, a motor vehicle. For example, it may be an oil, water or air conditioning circuit of a motor vehicle, in particular in the engine area and/or in the battery area, in particular in motor vehicles operated by electric motors. The control valve is used to adjust, in particular to distribute, mix or shut off process fluids in the oil, water or air conditioning circuits of motor vehicles. Control valves of this type are actuated by an electromagnetic actuator in order to be able to realize different operating states, i.e. valve positions, of the actuating element.

The control valve according to one embodiment comprises an actuating element. The actuating element can be adjustable, in particular to close and/or at least partially open a fluid channel of the control valve through which the fluid flow can be directed or guided. The control valve can be used in multi-port valves for distributing, mixing and/or shutting off the respective process fluids, in particular oil, water or coolant flows.

Furthermore, the control valve comprises an electromagnetic actuator coupled to the control valve for applying actuating forces. The coupling of the actuating element and the actuating drive can be non-positive and/or positive. For example, the electromagnetic actuator is an electric motor, such as a brushless DC motor (BLDC).

According to another embodiment, the control valve comprises a device designed according to one of the aspects or exemplary embodiments described above for detecting the temperature of the fluid flow of the control valve. In this respect, reference can be made to the explanations in this respect, which apply in an analogous manner to the control valve.

According to another embodiment, which may be combined with the preceding aspects and exemplary embodiments, a control valve, in particular a directional control valve, for adjusting a fluid flow of, for example, a motor vehicle is provided. The control valve may be configured according to the aspect previously described. Control valves of this type are connected to a fluid circuit of a motor vehicle, for example. For example, it can be an oil, water or air-conditioning circuit of a motor vehicle, in particular in the engine area and/or in the battery area, in particular in motor vehicles operated by electric motors. The control valve is used to adjust, in particular to distribute, mix or shut off process fluids in the oil, water or air conditioning circuits of motor vehicles. Control valves of this type are actuated by an electromagnetic actuator in order to be able to realize different operating states, i.e. valve positions, of the actuating element.

The control valve comprises a control valve housing with at least one fluid channel. The fluid channel may comprise a fluid inlet, a fluid outlet, and a valve chamber arranged therebetween with respect to the fluid flow direction. The valve chamber may be referred to as that region within the control valve housing within which an actuating element can move to open and/or close the fluid channel, in particular rotate about a rotational actuation axis and/or translate along a translational actuation axis.

The control valve according to another embodiment further comprises an actuating element movable in a valve space defined by the control valve housing for opening and/or closing the at least one fluid channel. For opening and/or closing the fluid channel, the actuator may cooperate with a valve seat. The valve seat is arranged in the area of the valve chamber or delimits it at least in sections. In a multi-way valve, such as a ½ or ⅔ multi-way valve, the valve chamber can form a mixing chamber into which at least two fluid inlets open and from which at least one fluid outlet extends. Accordingly, different fluid flows, which may originate, for example, from different components of the motor vehicle, in particular the motor vehicle engine or battery components, meet in the mixing chamber, resulting in a mixed fluid.

According to another embodiment, the control valve further comprises a device configured in particular according to one of the aspects or exemplary embodiments described above for detecting the temperature of the fluid flow. Thereby, the device is adapted to detect the fluid temperature in the valve chamber, in particular in the mixing chamber. That is, the device is adapted to sense the mixing fluid temperature. In some embodiments, the mixing fluid temperature is particularly suitable for drawing conclusions about the operability of the control valve. For example, by detecting the mixing fluid temperature, it is possible to detect and/or monitor how the different fluid flows mix as a function of different positions of the actuating element.

In another embodiment of the control valve, the control valve further comprises an electromagnetic actuator having a primary coil integrated into a primary circuit for actuating the actuating element. The electromagnetic actuator further comprises a detection coil integrated into a detection circuit for detecting fluid temperature. The detection circuit comprises a temperature-sensitive resistor exposed to the fluid flow, such as a thermistor, in particular a Negative Temperature Coefficient thermistor. The temperature-sensitive resistor may have a predetermined resistance-temperature characteristic. It should be understood that the temperature sensitive resistor does not need to be in direct contact with the fluid flow. It is sufficient that the temperature-sensitive resistor is arranged such that it changes its temperature as a function of the fluid temperature, in particular the mixed fluid temperature. According to an exemplary further development, the detection circuit is configured to inductively influence the primary circuit as a function of the fluid temperature. With respect to the inductive influence, reference can be made to the preceding embodiments with respect to the device or method, the embodiments of which are transferable with respect to the control valve.

In another embodiment of the control valve, the device comprises a detection circuit with a detection coil and a temperature-sensitive resistor, such as a thermistor, in particular a Negative Temperature Coefficient thermistor, coupled to the detection coil and exposed to the fluid flow. The detection coil and/or the temperature-sensitive resistor are/is fixedly attached to the actuating element or to the control valve housing, in particular a valve seat cooperating with the actuating element, in the fluid channel. For example, the detection coil and/or the temperature sensitive resistor are/is overmolded or overmolded by the material of the actuating element. The coil, the detection coil and the thermosensitive resistor may be coupled to each other via a connecting cable.

The present embodiments also relate to a line system for a motor vehicle, in particular for cooling an engine or for providing an anode and/or cathode current in a fuel cell, having a control valve in accordance with one of the aspects or exemplary embodiments described above.

BRIEF DESCRIPTION OF THE DRAWINGS

In the following, further properties, features and advantages of the invention will become clear by a description of preferred embodiments of the invention with reference to the accompanying exemplary drawings, in which show.

DETAILED DESCRIPTION

Figure 1:
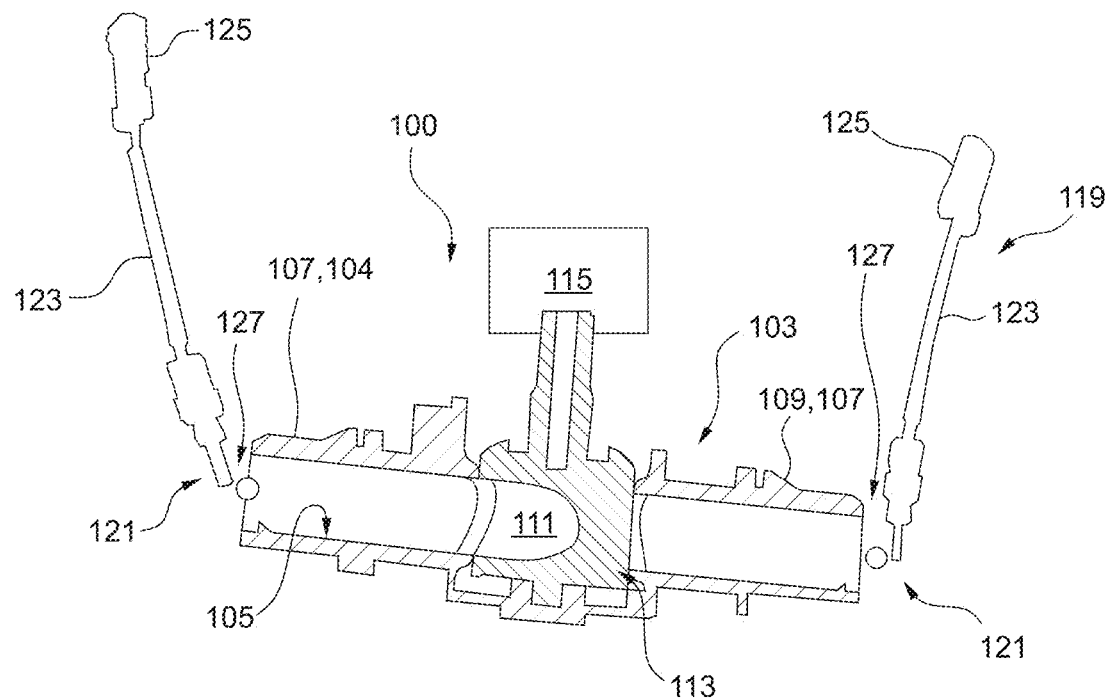
FIG. 1: a schematic diagram of a generic control valve according to the state of the art.

In the following description of exemplary embodiments of the present invention, on the basis of the accompanying figures, a control valve according to the embodiments is generally provided with the reference numeral 1. Generic control valves 1 are used, for example, for thermal management in motor vehicles and serve, for example, to distribute, mix and/or shut off process fluids such as oils, water and/or coolants. The control valve 1 according to the embodiment shown in FIG. 2 can, for example, be a shut-off valve with a fluid inlet 3 and a fluid outlet 5 or a directional control valve, in particular a multi-way valve, such as a ½ or ⅔ multi-way valve, in which only one fluid channel is visible.

Referring to FIG. 1, a generic prior art control valve 100 is schematically illustrated. The control valve 100 includes a valve housing 103 defining a fluid channel 105 through which a process fluid flow can be directed. In particular, the fluid channel 105 is delimited by a fluid inlet 107, 109 and a fluid outlet 109, 107. Viewed in the direction of flow, between fluid inlet and fluid outlet 107, 109 is a valve chamber 111 in which the actuating element 113 designed as a rotary piston is arranged. The rotary piston valve member 113 can be adjusted between different rotational positions in order to realize different flow scenarios. The actuating element 113 is operated by a schematically indicated actuator 115.

The control valve 100 further comprises a temperature sensing device. The temperature sensing device comprises two substantially identically configured temperature sensing sections 117, 119, each of which measures a fluid temperature. In this regard, one temperature sensing section 117, 119 arranged upstream with respect to the fluid flow direction is arranged in the region of the fluid inlet 107, 109, while the other temperature sensing section 119, 117 arranged downstream with respect to the fluid flow direction is arranged in the region of the fluid outlet 109, 107. Each temperature sensing section 117, 119 comprises a temperature sensor 121 exposed to the fluid, each of which is connected via an electrical connection cable 123 to an electrical coupling point 125 for connection to an electrical control system, for example a control valve or motor vehicle control system. For passing the cables and/or temperature sensors 119, 123 out of the fluid channel 105 into the environment, the control valve housing 103, in particular the fluid inlet 107, 109 and the fluid outlet 109, 107 have feedthroughs arranged schematically by the reference signs 127. The temperature detection device thus determines a temperature value in the region of the fluid inlet 107, 109 and a temperature value in the region of the fluid outlet 109, 107 by comparing the two temperature values, the operation of the control valve can be controlled.

Figure 2:
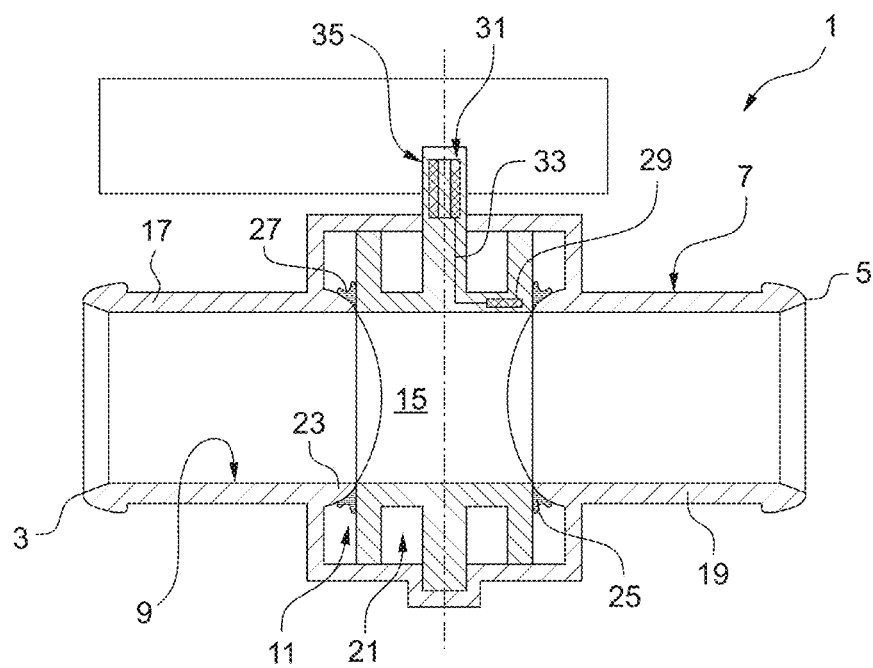
FIG. 2: a schematic sectional view of an exemplary embodiment of a control valve according to one embodiment.
Figure 3:
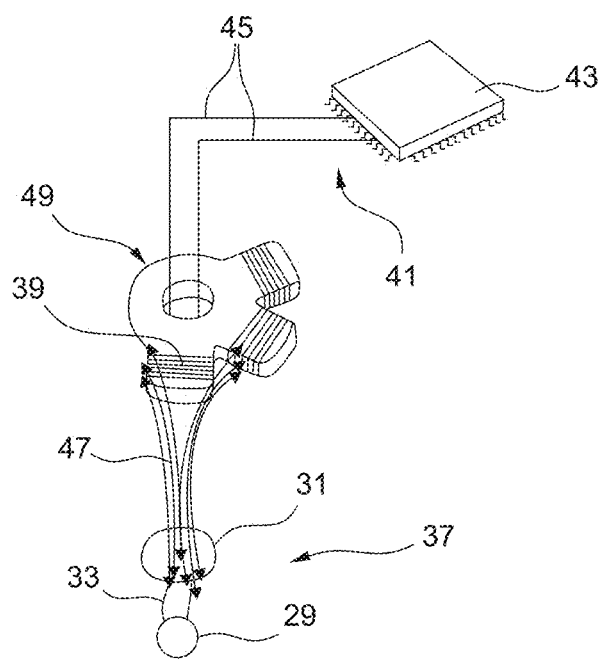
FIG. 3: a schematic representation of a section of the control valve of FIG. 2 to illustrate fluid temperature sensing.

With reference to FIGS. 2 and 3, the structure and operation of an exemplary embodiment of a control valve 1 according to the embodiment will be explained in more detail. The control valve 1 according to the embodiment basically comprises a control valve housing 7, which delimits a fluid channel 9 through which the process fluid flow can be guided, and an actuating element 11, which can be actuated to at least partially open and/or close the fluid channel 9 by an electromagnetic actuator 13, such as an electric motor, in particular a brushless DC motor (BLDC). The actuating element 11, which in FIG. 2 is in the form of a rotary piston, comprises at least one through bore 15, via which the fluid inlet 3 can be brought into fluid communication with the fluid outlet 5, in order to permit at least partial process fluid flow through the control valve 1.

The fluid channel 9 extends substantially in a straight line through the valve housing 7. A valve chamber 21 is located between a tubular housing section 17, which bounds the fluid channel 9 in the fluid inlet area 3, and a tubular housing section 19, which bounds the fluid channel 9 in the fluid outlet area 5, and the actuating element 11 can be moved, in particular rotated, in the valve chamber to realize the different flow scenarios. In case the control valve 1 is designed as a multi-way valve, the valve chamber 21 simultaneously forms a so-called mixing chamber, into which at least two process fluid inlets 3 open and from which at least 1 process fluid outlet 5 extends. This means that mixing of the incoming process fluids can take place in the mixing chamber 21. The mixed fluid can then be discharged via the fluid outlet 5. To close and/or release the fluid channel 9, the valve member 11 cooperates with a valve seat 23 which is part of the valve housing 7. Sealing elements 25, 27 can be used to increase the sealing effect, such as O-ring seals.

By the temperature detection according to the embodiment, it is possible to detect and monitor the fluid temperature, in particular the mixed fluid temperature, in the area of the valve chamber 21 or the mixing chamber 21. The temperature detection or monitoring is carried out as follows: a temperature-sensitive resistor 29, such as a thermistor or a Negative Temperature Coefficient thermistor, as well as a detection coil 31 and an electrical connection cable 33 connecting the detection coil 31 to the temperature-sensitive resistor 29 are overmolded or cast into the material of the valve member 11. The temperature-sensitive resistor 29 is arranged in such a way that, at least in the open state of the control valve 1, the process fluid flow flows around it in such a way that it can detect or sense the process fluid temperature. In other words, the temperature of the flowing fluid can cause a temperature change of the temperature-sensitive resistor 29. A current can flow through the detection coil 31, which is part of a detection circuit 37 (FIG. 3), causing a magnetic field of the detection coil 31. In principle, the valve member 11 can be rotatably supported in the electromagnetic actuator 13 via a bearing, such as a rotary bearing 35. The actuating force provided by the electromagnetic actuator 13 can be converted into a rotational movement of the actuating element 11 for adjusting the actuating element 11.

Within the detection circuit 37 (FIG. 3), the detection coil 31 may be connected in series with the thermosensitive resistor 29. If the resistance value of the thermosensitive resistor 29 changes according to its temperature-resistance characteristic as a function of the temperature of the flowing fluid, which influences the temperature at or of the temperature-sensitive resistor 29, a change is caused in the detection circuit 37. In particular, the applied current strength changes, which in turn influences or changes the induced magnetic field of the detection coil 31. Due to the inductive coupling of the detection coil 31 with a primary coil 39 (FIG. 3) of a primary circuit 41 of the electromagnetic actuator 13, the detection coil 31 can inductively influence the primary coil 39. The temperature detection device according to the embodiment or the control valve 1 according to the embodiment is able to conclude a fluid temperature on the basis of the inductive influence of the detection coil 31 and the primary coil 39.

For the operation of the temperature detection, please refer to the previous detailed description. FIG. 3 schematically shows an electrical circuit board 43 which is integrated in the primary circuit via electrical connections 45. Also in electrical connection with the primary circuit 41 is a rotor-stator unit 49 for generating actuating force. As shown in FIG. 3, this can be, for example, a 3-phase DC motor, such as a brushless DC motor (BLDC).

Separate from this and not connected by cables or the like is the detection circuit 37, which is located in the area of the valve housing 7 (see FIG. 2). In FIG. 3, the schematic inductive influence of primary circuit 41 and detection circuit 37 is indicated by the double arrows 47. The detection coil 31 and the primary coil 39 induce changes to each other in the current flow in the respective other coil, so that due to the known relative position of the coils to each other and the known excitation via the electromagnetic actuator 13, a change in power and/or energy consumption at the electromagnetic actuator 13 can be detected, in particular monitored. Furthermore, due to the known relationships between power or energy output and the known components of the electromagnetic actuator 13, a correlation between fluid temperature and energy output or power change can be detected and monitored.

The embodiments therefore makes it possible to detect and monitor the fluid temperature even in the valve chamber 21 or the mixing chamber 21 without contact and without the need for housing feedthroughs, such as require costly sealing and extra manufacturing steps. The embodiments show that by taking advantage of magnetic induction and knowledge of the characteristics of the electromagnetic actuator used, the fluid temperature even in the mixing chamber area can be detected and monitored inexpensively and with measurement accuracy.

The features disclosed in the foregoing description, figures, and claims may be significant, both individually and in any combination, for the realization of the invention in the various embodiments.'

REFERENCE LIST 1, 100 control valve
3, 107 fluid inlet
5, 109 fluid outlet
9, 105 fluid channel
7, 103 control valve housing
11, 113 actuating element
13, 115 electromagnetic actuator
15 fluid bore
17, 19 tubular housing section
21, 111 valve chamber
23 valve seat
25, 27 seal
29, 121 temperature-sensitive resistor
33, 123 electrical connection cable
31 detection coil
35 storage
37 detection circuit
39 primary coil
41 primary circuit
43 printed circuit board
45 electrical connection
47 inductive influence
49 rotor-stator unit
117, 119 temperature detection section
125 electrical coupling point
127 housing passage

The invention claimed is:

1. A method for detecting a fluid temperature of a fluid flow of a control valve with an electromagnetic actuator, the method comprising:
exposing the fluid flow to a temperature-sensitive resistor;
integrating the temperature-sensitive resistor into a detection circuit; and
inductively influencing, by the detection circuit, a primary circuit of the electromagnetic actuator, wherein the inductively influencing depends on the fluid temperature, wherein the detection circuit is configured to detect a power consumption change of the primary coil of the electromagnetic actuator, and to associate it to the fluid temperature.

2. The method of claim 1, wherein a change of a magnetic field of the primary circuit and/or a change of a current of the primary circuit, is associated with the fluid temperature.

3. The method of claim 1, wherein as a result of the inductive interference of the primary circuit, an energy consumption changes.

4. The method of claim 3, wherein the fluid temperature is inferred via the energy consumption change.

5. The method of claim 1, further comprising:
monitoring the fluid temperature continuously or cyclically; and
deriving control and/or regulation measures based on the monitoring.

6. The method of claim 1, wherein the temperature-sensitive resistor comprises a thermistor.

7. A device for detecting a fluid temperature of a fluid flow of a control valve having an electromagnetic actuator, the device comprising:
a detection circuit having integrated therein a temperature-sensitive resistor exposed to the fluid flow, wherein the detection circuit is configured to inductively influence the electromagnetic actuator; and
electronics configured to:
associate the inductive influence of the electromagnetic actuator with the fluid temperatures,
detect a power consumption change of a primary coil of the electromagnetic actuator, and
associate the power consumption change to the fluid temperature.

8. The device of claim 7, wherein the temperature-sensitive resistor comprises a thermistor.

9. The device of claim 8, wherein the thermistor comprises a Negative Temperature Coefficient thermistor.

10. The device of claim 8, wherein the detection circuit further comprises a detection coil with which the temperature-sensitive resistor is connected in series.

11. The device of claim 10, wherein the temperature-sensitive resistor is configured to change its resistance value as a result of a change in the fluid temperature and to change the power consumption of the detection coil.

12. The device of claim 11, wherein the detection coil is inductively coupled to the primary coil of the electromagnetic actuator, such that the power consumption of the detection coil changes.

13. The device of claim 7, wherein:
the electronics are configured to monitor the fluid temperature; or
the electronics are coupled to monitoring electronics for monitoring the fluid temperature.

14. A control valve for adjusting a fluid flow of a motor vehicle, the valve comprising:
an actuating element;
an electromagnetic actuator, coupled to the actuating element, configured to apply actuating forces; and
a device configured to detect a fluid temperature of the fluid flow and including a detection circuit having integrated therein a temperature-sensitive resistor exposed to the fluid flow and electronics, wherein the detection circuit is configured to inductively influence the electromagnetic actuator, and wherein the electronics configured to detect a power consumption change of a primary coil of the electromagnetic actuator and associate the power consumption change to the fluid temperature.

15. The control valve of claim 14, further comprising:
a control valve housing with at least one fluid channel; and
an actuating element, movable in a valve chamber defined by the control valve housing, configured to open and/or close the at least one fluid channel;
wherein the device is configured to detect the fluid temperature in the valve chamber.

16. The control valve of claim 15, further comprising:
an electromagnetic actuator, having a primary coil integrated in a primary circuit, configured to actuate the actuating element; and a detection coil, integrated in the detection circuit, configured to detect the fluid temperature, wherein the detection circuit has a temperature-sensitive resistor exposed to the fluid flow and configured to inductively influence the primary circuit depending on the fluid temperature.

17. The control valve of claim 15, wherein the detection circuit further comprises:
a detection coil; and
a temperature-sensitive resistor coupled to the detection coil and exposed to the fluid flow, wherein the detection coil and/or the temperature-sensitive resistor are fixedly attached to the actuating element or to the control valve housing.

18. The control valve of claim 17, wherein the detection coil and/or the temperature-sensitive resistor are fixedly attached to a valve seat in the fluid channel.

* * * * *